United States Patent [19]

Daghe et al.

[11] Patent Number: 5,076,541
[45] Date of Patent: Dec. 31, 1991

[54] TAMPERPROOF ROTARY VALVE

[75] Inventors: Joe L. Daghe, Dubuque, Iowa; John D. Eckel, Hazel Green, Wis.; Warren G. Heidbrier, Dubuque, Iowa

[73] Assignee: A. Y. McDonald Manufacturing Company, Dubuque, Iowa

[21] Appl. No.: 678,889

[22] Filed: Mar. 28, 1991

Related U.S. Application Data

[63] Continuation of Ser. No. 451,146, Dec. 15, 1989, abandoned.

[51] Int. Cl.$^5$ .............................................. F16K 5/04
[52] U.S. Cl. .................................. 251/309; 403/326
[58] Field of Search ................. 251/304, 309; 137/315; 403/326

[56] References Cited

U.S. PATENT DOCUMENTS

| | | | |
|---|---|---|---|
| 3,360,236 | 12/1967 | Hulslander | 251/309 X |
| 3,806,087 | 4/1974 | Hulslander | 251/309 |
| 4,077,232 | 3/1978 | Grosseau | 403/326 X |
| 4,261,668 | 4/1981 | Rigal | 403/326 X |
| 4,659,064 | 4/1987 | Scobie et al. | 403/326 X |
| 4,714,236 | 12/1987 | Filiberti | 251/315 |

Primary Examiner—John C. Fox
Attorney, Agent, or Firm—Wood, Phillips, Mason, Recktenwald & Van Santen

[57] ABSTRACT

A tamperproof rotary valve which includes a valve body having a fluid flow passage extending therethrough. The passage is intersescted by an actuator opening in the body and defining a valve chamber thereat. A rotary valve is disposed in the chamber for opening and closing the fluid flow passage. An actuator is journaled in the actuator opening and is coupled to the rotary valve for rotating the valve. A groove is formed about the actuator, and a contractible/expandable locking ring is disposed in the groove and projects outwardly of the groove beyound the bounds of the actuator when in a free, expanded condition. The locking ring is contractible into the groove to allow assembly of the actuator into the actuator opening. A locking groove is formed in the actuator opening in the valve body and into which the locking ring expands when the actuator is in a proper assembled position in the actuator opening. The actuator has a surface for biasing the locking ring into the locking groove in response to any attempted withdrawal movement of the actuator in said opposite direction. A resilient grommet is compressed between an enlarged portion of the actuator and the valve body to generate torque therebetween to resist rotation. A valve seal is disposed in a seal seat in the valve body about the valve ball, the valve seal being resilient and having a stiffening ring embedded therein.

8 Claims, 2 Drawing Sheets

TAMPERPROOF ROTARY VALVE

This application is a continuation of application Ser. No. 451,146, filed Dec. 15, 1989, now abandoned.

FIELD OF THE INVENTION

This invention relates to valves and, particularly, to tamperproof valves such as ball valves, plug valves and the like.

BACKGROUND OF THE INVENTION

Rotary valves of the ball valve or plug valve type are used as gas stops and for certain other purposes. It is desirable to construct gas stops so that they cannot be disassembled and reassembled by any unauthorized person. Many arrangements have been developed to make tamperproof valves of the character described. For instance, U.S. Pat. Nos. 2,539,106 to Schenck, dated Jan. 23, 1951; U.S. Pat. No. 2,989,081 to Johnson, dated Aug. 4, 1954; and U.S. Pat. No. 3,359,999 to Mueller, dated Dec, 26, 1967; all show one form or another of a valve actuator element which is readily assembled and difficult if not prevented from being disassembled. This is accomplished by a snap ring or spring which is inwardly retractable into a groove in the actuator element during assembly and which is outwardly expandable into a locking groove in the valve body when fully assembled. A problem with such constructions is that the snap rings or springs tend to ride out of the locking groove after extended use and wear. Consequently, more positive constructions were developed as shown in Poisker U.S. Pat. No. 3,004,550, dated Oct. 17, 1961.

Most tamperproof gas stops, such as that shown in the Poisker patent, were developed to rely upon the use of some sort of locking arrangement that requires a special tool to release the valve plug for removal from the valve body. In most such instances, the expedience used to make the ball or plug valve tamperproof added substantially to its cost.

Accordingly, an improved tamperproof plug valve was developed as disclosed in U.S. Pat. No. 4,014,512 to Cheever et al, dated Mar. 29, 1977 and assigned to the assignee of this invention. That patent shows a tamperproof plug valve which requires no special parts other than the valve body and the valve plug. After the valve plug is inserted into the valve body, two stacked, slit, frusto-conical, transversely arched spring washers having teeth make a one-way tight friction fit on a projecting end portion of the valve plug. The outer peripheral portion of the forward of the two washers bears on a recessed planar area of the valve body which is surrounded by a continuous boss so a prying tool cannot be inserted beneath either washer.

The instant invention provides a rotary valve, shown as a ball valve, wherein the basic means of an expandable locking ring is used for rendering the valve tamperproof but means are provided for preventing the locking ring from riding out of its locking groove should removal of the actuator be attempted.

SUMMARY OF THE INVENTION

An object, therefore, of the invention is to provide a new and improved tamperproof rotary valve construction of the character described.

In the exemplary embodiment of the invention, generally, the rotary valve includes a valve body having a fluid flow passage extending therethrough. The passage is intersected by an actuator opening in the body and defining a valve chamber thereat. A rotary valve is disposed in the chamber for opening and closing the fluid flow passage in the valve body. An actuator is journaled in the actuator opening and is coupled to the rotary valve for rotating the valve.

The invention contemplates providing tamperproof means between the actuator and the valve body including a groove about the actuator, and a contractible/expandable locking ring is disposed in the groove and projects outwardly of the groove beyond the bounds of the actuator when in a free expanded condition. The locking ring is contractible into the groove to allow assembly of the actuator into the actuator opening. A locking groove is provided in the actuator opening in the valve body and into which the locking ring expands automatically when the actuator is in its proper assembled position in the actuator opening.

In particular, the locking ring is circular in cross-section and, when disposed in the locking groove, abuts a surface portion of the groove which is of a mating circular configuration. The abutment surface portion opposes movement of the locking ring in a direction opposite the insertion or assembly direction of the actuator into the actuator opening. Preferably, the depth of the circular locking groove is equal to at least the cross-sectional radius of the circular locking ring. The actuator itself has a chamfered surface portion facing in a direction opposite the insertion direction of the actuator for preventing the locking ring from riding out of the locking groove by biasing the locking ring into the locking groove should any attempt be made to remove the actuator from the actuator opening. In addition, the actuator opening has a frusto-conical cam surface portion on the lead-in side of the locking groove to provide means for engaging and contracting the locking ring automatically in response to inserting the actuator into the actuator opening.

Another feature of the invention is the provision of torque generating means between the valve body and the actuator. Specifically, the actuator has an enlarged portion opposing a land portion on the valve body. These portions are adjacent a tapered mouth between the actuator and the actuator opening. A resilient grommet has an enlarged head portion for sandwiching between the enlarged portion of the actuator and the land portion of the valve body, and a tapered portion for biasing into the tapered mouth between the actuator and the actuator opening. The resilient grommet is compressed upon assembling the actuator into the actuator opening of the valve body and provides friction resistance to effect the torque generating means.

A further feature of the invention is an annular resilient valve seal in the valve body about the fluid flow passage for sealing against the valve ball. The resilient seal is of a molded structure and has a stiffening ring molded integrally therewithin. One side of the resilient valve seal has a frusto-spherical surface area for engaging the valve ball, and the opposite side of the valve seal has a pair of concentric annular ridges projecting therefrom for engaging a generally flat sealing surface on the seal seat of the valve body.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
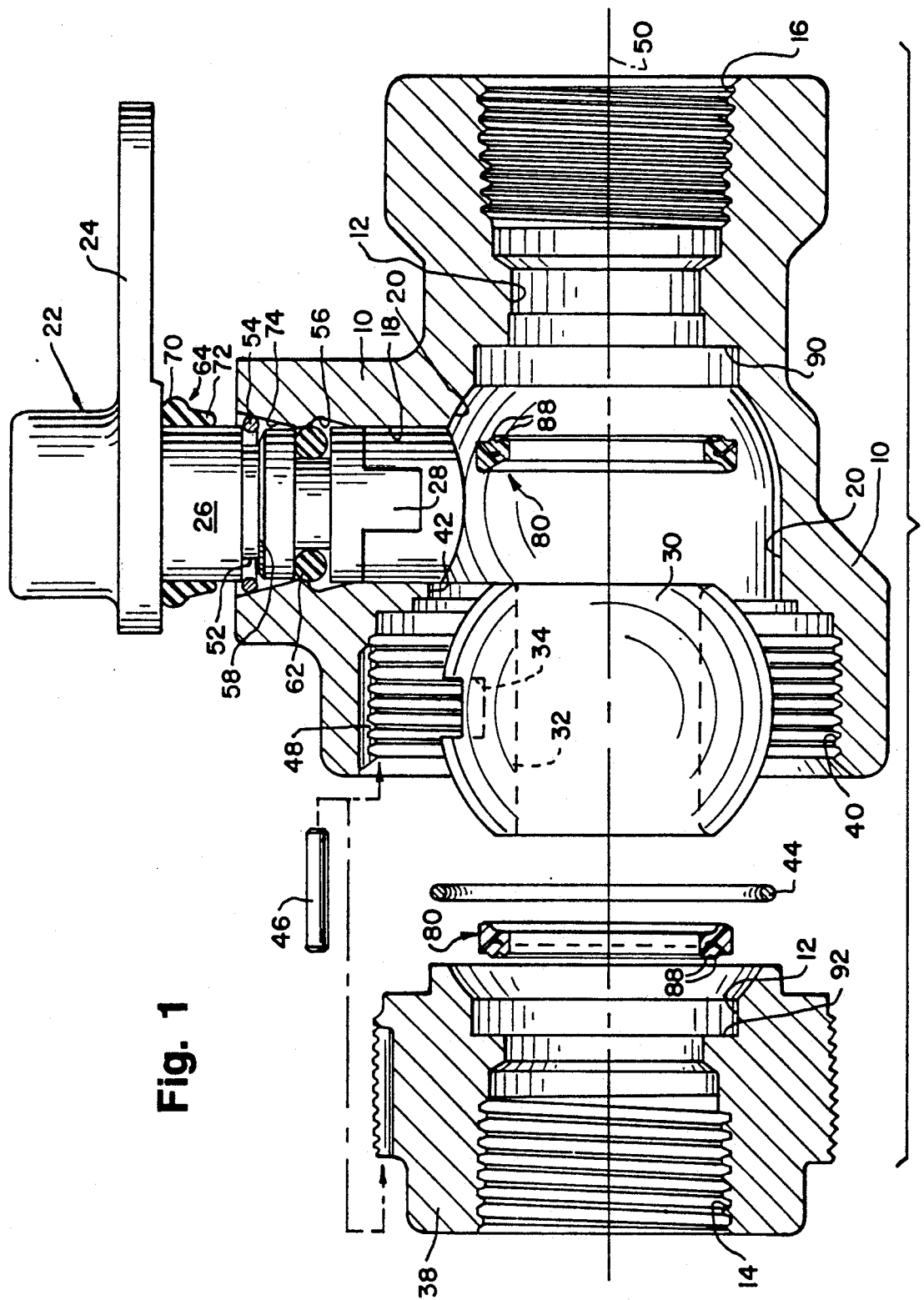
FIG. 1 is an exploded axial section through the rotary valve incorporating the concepts of the invention.
Figure 2:
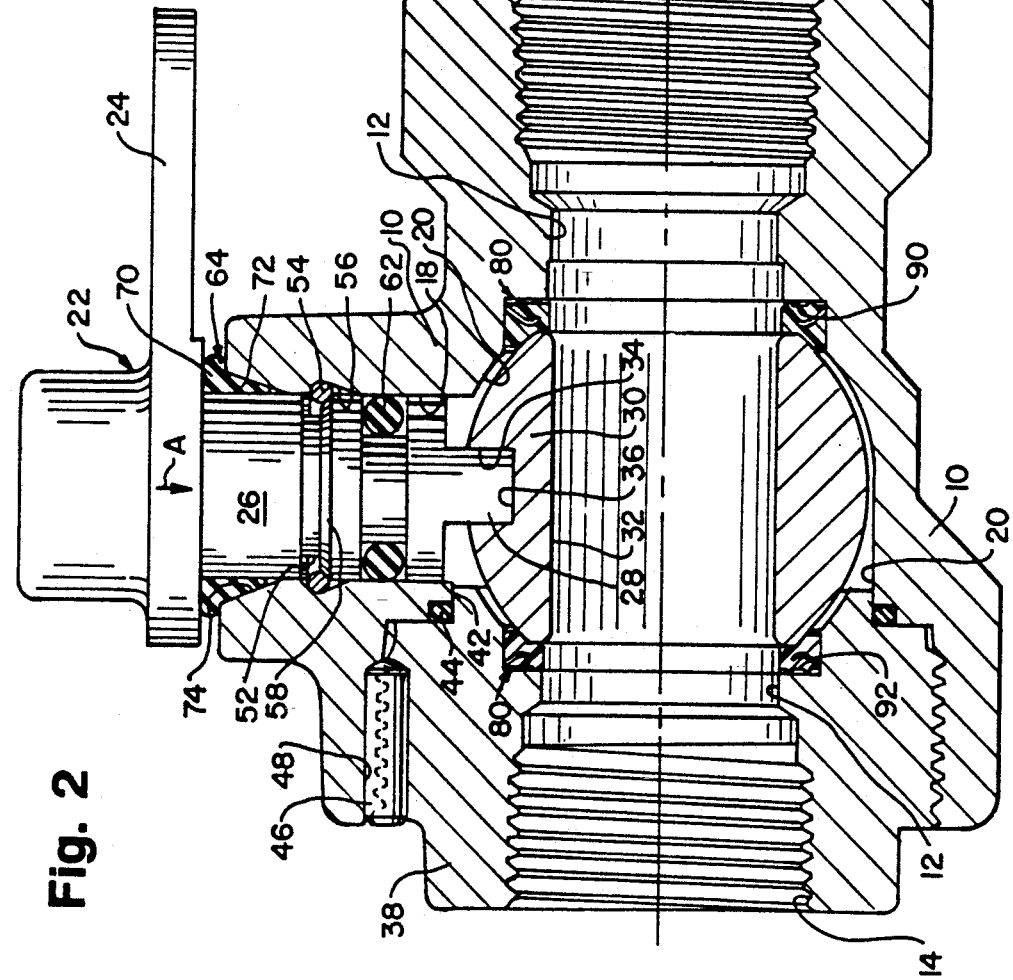
FIG. 2 is an axial section through the valve in assembled condition.

The concepts of this invention are exemplified in a rotary valve disclosed herein in the form of a ball valve illustrated in FIGS. 1 and 2. FIG 1 shows the components of the valve in an exploded depiction, and FIG. 2 shows the valve in fully assembled condition. The ball valve includes a valve body 10 formed of any suitable material, the precise nature of which is independent upon the intended use of the valve. For example, housing 10 could be formed of plastic, bronze, and the like. Housing 10 has a fluid flow passage 12 extending therethrough to terminate in ports 14 and 16 which are internally threaded to receive fittings (not shown) for intended purposes within a fluid flow line. Fluid flow passage 12 is intersected by an actuator opening 18 in valve body 10 and defining a valve chamber 20 thereat.

An actuator, generally designated 22, having a lockwing 24, is journaled in actuator opening 18 by means of a depending actuator stem 26. The actuator stem terminates in a key-type end 28 of rectangular configuration.

A spherical valve ball 30 is disposed in valve chamber 20 and includes a through bore 32 which, as is well known in ball valves, is oriented to be coaxial with passage 12 to allow fluid to flow therethrough, as shown in FIG. 2. When the valve ball is rotated approximately 90 degrees, bore 32 is disaligned with the axis of passage 12 and thus stops fluid flow. To this end, one side of valve ball 30 is provided with a keyway-type groove 34 for mating with keyed end 28 at the distal end of actuator stem 26. The dimensions of groove 34 are such that it can slip over keyed end 28 of the valve stem. The bottom 36 of groove 34 is planar to provide a positive positional stop for transverse insertion of actuator 22 during assembly.

To facilitate assembly of the valve, port 14 actually is formed in a fitting 38 which is threaded into an enlarged bore in valve body 10, as at 40. It can be seen that the threaded bore is larger than the diameter of valve chamber 20 and the valve chamber actually opens into the enlarged bore on a diameter, as at 42, which is larger than the diameter of valve ball 30. Therefore, in assembly, ball 30 may be introduced into chamber 20 through enlarged port 40 and area 42, and fitting 38 thereafter is threaded into the enlarged bore in the valve body to seat the valve ball, as described in greater detail hereinafter. A resilient seal ring 44 is compressed between fitting 38 and valve body 10. Fitting 38 is retained by the threads and also is made tamperproof by inserting a hardened steel pin 46 into a longitudinally drilled hole 48 at or parallel to the pitch diameter of the threads in the fitting and the valve body. Actuator 22 is inserted into actuator opening 18 such that end 28 is parallel to axis 50 before ball 30 is assembled through enlarged bore 42 into chamber 20 with ball slot 34 parallel to axis 50. In this configuration, through bore 32 of the valve ball is transverse to through passage 12. Lockwing 24 of the actuator then can rotate the valve ball 90° to its position wherein the lockwing extends in an "on-line" direction to readily indicate a valve open condition as is conventional in the industry.

The invention contemplates tamperproof means between actuator 22, particularly actuator stem 26, and valve body 10 so that when assembled as described above, the valve cannot be disassembled and reassembled by any unauthorized person. In fact, with the structure of the invention, the valve cannot be disassembled without destroying some of the components thereof.

Figure 3:
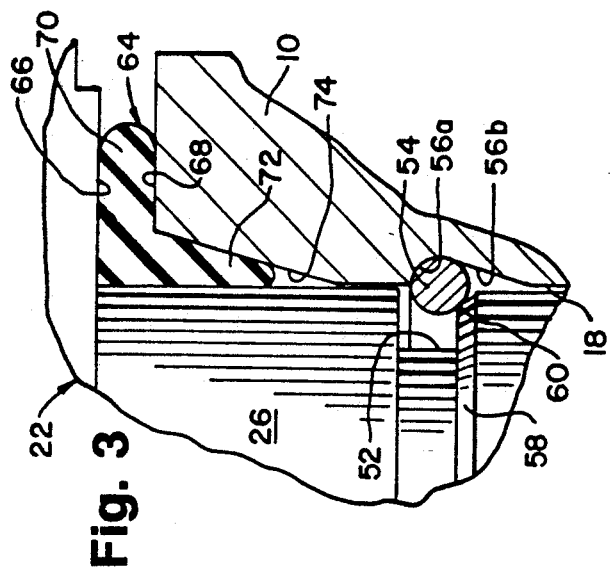
FIG. 3 is a fragmented section, on an enlarged scale, of the area about the valve actuator which includes the tamperproof means and the torque generating means.

More particularly, and referring to FIG. 3 in conjunction with FIGS. 1 and 2, a groove 52 is machined about valve stem 26 for receiving a contractible/expandable locking ring 54. The locking ring may be of various configurations, including a split, overlapping clip ring which can be assembled into groove 52 axially over the end of actuator stem 26, or the locking ring may be a C-clip for assembling into groove 52 transversely of actuator stem 26. In any event, the locking ring is of a diameter which, when in an expanded condition, projects radially outwardly of groove 52 as shown in FIGS. 1-3. The locking ring is sufficiently contractible so as to be contracted totally within the bounds of groove 52 to permit actuator stem 26 to be assembled into actuator opening 18 in valve body 10 in an insertion direction as indicated by arrow "A" (FIG. 2). The valve body has a locking groove 56 (FIGS. 1 and 2) in actuator opening 18 and into which locking ring 54 expands automatically when actuator 22 is in its proper assembled position as shown in FIG. 2.

Locking ring 54 is circular in cross-section to allow for easy assembly and to prevent the ring from twisting or hanging up during insertion of the actuator.

FIG. 3 shows in greater detail the configuration of locking groove 56 (FIGS. 1 and 2). Specifically, the locking groove has an upper abutment surface portion 56a and a depending tapered portion 56b. As stated, locking ring 54 is circular in cross-section, and circular portion 56a of the locking groove is on a mating radius to that of the locking ring. In addition, the depth of the locking groove is equal to at least the radius of the locking ring, as shown in FIG. 3. As such, locking ring 54 is biased toward its expanded condition. To insure positive locking of locking ring 54 into the locking groove, actuator stem 26 is formed with a chamfered surface portion 58 about the lower edge of groove 52 for engaging the locking ring, as at 60 shown in FIG. 3, the upper edge 59 of the groove being precisely square. Therefore, any attempts to withdraw the actuator out of the valve body will cause the chamfered surface to positively engage against the locking ring and drive the locking ring into the locking groove in the valve body, particularly into circular portion 56a of the locking groove. Tapered portion 56b (FIG. 3) of the locking groove is provided so that a sealing O-ring 62 (FIGS. 1 and 2) can easily pass over the locking groove without any scoring or damage to the O-ring which is fabricated of relatively soft resilient material.

Another feature of the invention is the provision of torque generating means between valve body 10 and actuator 22, and the torque generating means again is shown in greater detail in FIG. 3 in conjunction with FIGS. 1 and 2. More particularly, a resilient grommet, generally designated 64, is sandwiched between a downwardly facing flat surface 66 on an enlargement of actuator 22 and an opposing flat land 68 at the top of valve body 10. Actually, grommet 64 has an enlarged head portion 70 which projects radially outwardly and is sandwiched between flat surface 66 of the actuator and flat land 68 of the valve body. The grommet also has a depending tapered portion 72 which projects downwardly into a tapered mouth 74 between actuator stem 26 and the upper area of valve body 10 in actuator opening 18. As seen in the drawings, this tapered mouth is formed by machining into the valve body at the top of actuator opening 18.

In comparing FIG. 1 with FIGS. 2 and 3 and particularly with FIG. 3, it can be seen that when actuator 22 is driven downwardly into assembled condition in valve body 10, with actuator stem 26 projecting into actuator opening 18, and when the actuator becomes locked by the disposition of locking ring 54 in locking groove 56, grommet 64 becomes compressed and engages a number of surfaces, including flat surface 66 on the underside of actuator 22, flat land 68 on the top of valve body 10, tapered mouth 74 cut into the valve body, and the outside cylindrical surface of actuator stem 26. This interengagement between the resilient grommet an both the valve body and the actuator provides considerable frictional resistance against rotary movement of the actuator relative to the valve body and, thereby, provides torque generating means between the valve body and the actuator.

Figure 4:
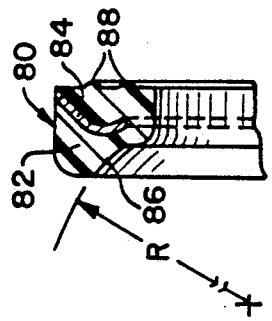
FIG. 4 is a fragmented section, on an enlarged scale, taken radially through the valve seal in the valve body for the valve ball.

A further feature of the invention is shown in greater detail in FIG. 4 in conjunction with FIGS. 1 and 2. Specifically, a pair of ring-like valve seals, generally designated 80, are disposed in seal seats formed in valve body 10 and fitting 38. During assembly, the right-hand valve seal 80, as viewed in FIGS. 1 and 2, first is disposed in its seat before valve ball 30 is assembled into position as described above. The left-hand valve seal is disposed in its seat in fitting 38 whereupon the fitting then is threaded into the valve body and the two valve seals 80 position and properly seat the valve ball.

The detailed construction of each valve seal 80 is shown best in FIG. 4 which is an enlarged, fragmented section radially through the right-hand valve seal as disposed in FIGS. 1 and 2. It should be understood that both valve seals 80 are identical in construction but simply are reversed in axial orientation for engaging opposite sides of the valve at the axially spaced junctures between fluid flow passage 12 and valve chamber 20. Specifically, each valve seal 80 is fabricated of resilient rubber-like material 82, the material being dependent upon the fluid being handled by the valve, such as to prevent contamination or erosion of the material by the fluid. The valve seal is of a molded construction and includes a stiffening ring 84 embedded therein during the molding process so as to be molded integrally within the body of resilient material 82. The stiffening ring may be fabricated of metallic material. The stiffening ring is cup-shaped in cross-section as shown best in FIG. 4. The ring stiffens valve seal 80 and prevents pinching and/or clipping of the seal by ball 30 when the ball is throttled under high velocity flow conditions. The cup-shaped stiffening ring also serves as a secondary metal-to-metal seal in event a fire of sufficient intensity destroys the rubber-like primary seals.

Each valve seal 80 has a frusto-spherical surface area 86 on one side thereof for engaging valve ball 30. The opposite side of the seal has a pair of annular or circular ridges 88 projecting therefrom in an axial direction opposite the valve ball. The ridges engage against a flat sealing surface 90 (FIG. 2) on valve body 10 and a flat sealing surface 92 on fitting 38. These ridges are molded integrally with the valve seal and provide high unit load in critical sealing areas and yet provide adequate flexing and a positive seal under all temperature conditions, including low temperatures on the order of −20 degrees F., to allow normal operation of the valve.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:
1. A tamperproof rotary valve comprising:
a valve body having a fluid flow passage extending therethrough, the passage being intersected by an actuator opening in the body and defining a valve chamber thereat;
a rotary valve disposed in the chamber for opening and closing the fluid flow passage in the valve body;
an actuator journaled in the actuator opening and coupled to the rotary valve for rotating the valve, the actuator having a top and bottom and being assembled by moving the actuator into the actuator opening in an insertion direction until the actuator is in a seated position, the actuator having a lengthwise axis and an outer surface with a first diameter; and
tamperproof means between the actuator and the valve body for inhibiting removal of the actuator, said tamperproof means including a groove circumscribing the outer surface of the actuator, a chamfered surface portion on a lower edge of the groove, a contractible/expanding locking ring in the groove and projecting partially outwardly of the groove beyond the bounds of the outer surface of the actuator and resting on said chamfered surface when in a free unbiased condition, a locking groove in the actuator opening in the valve body and into which the locking ring expands when biased by the chamfered surface portion due to a force exerted on the actuator opposite to the insertion direction, a cam surface means located in the actuator opening on a lead-in side of the locking groove for engaging and contracting the locking ring automatically in response to inserting the actuator in the actuator opening during assembly, said cam surface means having a second diameter substantially equal to the first diameter, the locking ring being contractible fully into the groove by the cam surface means to allow clearance for the locking ring over the locking groove only during assembly of the actuator, said actuator surface and said cam surface means of said first and second diameters, respectively, being disposed outwardly of said groove to prevent tampering with said locking ring from externally of the valve, whereby when the actuator is inserted into the seated position, the locking ring returns to the unbiased condition on the chamfered surface wherein the partially outwardly projecting locking ring engages the locking groove such that with force exerted on the actuator opposite the insertion direction, the chamfered surface expands the locking ring outwardly against the locking groove thereby positively blocking further axial movement of the actuator.

2. The tamperproof rotary valve of claim 1 wherein said cam surface means is tapered to provide an outwardly opening lead-in mouth for centering the locking ring between the actuator and the actuator opening.

3. The tamperproof rotary valve of claim 2 wherein said cam surface means comprise a frusto-conical portion of the actuator opening.

4. The tamperproof rotary valve of claim 1 wherein said locking groove includes an abutment surface portion opposing movement of the locking ring in a direction opposite an insertion direction of the actuator into the actuator opening.

5. The tamperproof rotary valve of claim 4 wherein said locking ring is circular in cross-section, and said abutment surface portion is of a mating circular configuration in cross-section.

6. The tamperproof rotary valve of claim 5 wherein the depth of the locking groove is equal to at least the cross-sectional radius of the circular locking ring.

7. The tamperproof rotary valve of claim 1 wherein a trailing edge of the groove in the actuator is precisely square.

8. The tamperproof rotary valve of claim 1 wherein said actuator has a chamfered surface portion for biasing the locking ring into the locking groove in response to any attempted withdrawal movement of the actuator out of the actuator opening.

* * * * *